(12) United States Patent
Nguyen

(10) Patent No.: US 8,746,639 B2
(45) Date of Patent: Jun. 10, 2014

(54) FLAT PANEL WALL MOUNT

(76) Inventor: My Nguyen, Santa Ana, CA (US)

( * ) Notice: Subject to any disclaimer, the term of this patent is extended or adjusted under 35 U.S.C. 154(b) by 176 days.

(21) Appl. No.: 13/551,321

(22) Filed: Jul. 17, 2012

(65) Prior Publication Data

US 2014/0021312 A1    Jan. 23, 2014

(51) Int. Cl.
*A47B 96/06* (2006.01)

(52) U.S. Cl.
USPC .................. 248/205.1; 248/286.1; 248/291.1; 248/917; 361/679.02; 361/679.21

(58) Field of Classification Search
CPC .............. F16M 11/10; F16M 2200/04; F16M 2200/024; F16M 11/16; H05K 7/00
USPC ........ 248/205.1, 489, 495, 286.1, 291.1, 917; 361/679.02, 679.21
See application file for complete search history.

(56) References Cited

U.S. PATENT DOCUMENTS

| | | | | |
|---|---|---|---|---|
| 7,316,379 B1* | 1/2008 | Graham | ...................... | 248/298.1 |
| 8,456,808 B2* | 6/2013 | Grey et al. | .............. | 361/679.01 |
| 8,550,415 B2* | 10/2013 | Sculler et al. | ............. | 248/298.1 |
| 2005/0236543 A1* | 10/2005 | O'Neil | ........................ | 248/286.1 |
| 2006/0231711 A1* | 10/2006 | Shin | ............................ | 248/291.1 |
| 2007/0023593 A1* | 2/2007 | Fedewa | ......................... | 248/201 |
| 2010/0309615 A1* | 12/2010 | Grey et al. | .............. | 361/679.01 |
| 2011/0234926 A1* | 9/2011 | Smith | .......................... | 348/836 |
| 2013/0194728 A1* | 8/2013 | Manno | ..................... | 361/679.01 |

* cited by examiner

*Primary Examiner* — Anita M King
(74) *Attorney, Agent, or Firm* — Clement Cheng

(57) ABSTRACT

A flat panel wall mount for mounting a flat panel to a wall has a wall bracket connecting with a mounting bracket. The wall bracket has a wall bracket left section and a wall bracket right section. The wall bracket left section connects to the wall bracket right section by connectors such as bolts and nuts. A wall bracket left section bottom joining tab is formed on the wall bracket and a wall bracket right section bottom joining tab is formed on the wall bracket. The wall bracket left section bottom joining tab connects to the wall bracket right section bottom joining tab. The wall bracket left section bottom joining tab is parallel to the wall bracket right section bottom joining tab.

16 Claims, 3 Drawing Sheets

FLAT PANEL WALL MOUNT

FIELD OF THE INVENTION

The present invention is in the field of wall mounts for flat panel devices.

DISCUSSION OF RELATED ART

A variety of different mounting systems have been created for mounting television and display screens since flat screen LCD panels have become popular. The most rudimentary mounting system has often been a set of parallel channels mounted onto a wall to support a television panel. Other mounting systems have been described in the art including United States patents.

For example, U.S. Pat. No. D614,611, issued on Apr. 27, 2010 to Leung is an ornamental design for a TV mount. It consists of a rectangular fixture with two flat parallel channels mounted between the rectangular fixture and a wall to support the elevation of a television panel. The rectangular fixture is relatively wide in height to permit support for large panels. U.S. Pat. No. D631,875 issued on Feb. 1, 2011 to Skull et al. also describes an ornamental design for a mount for electronic display, which includes a relatively short in height rectangular fixture to support horizontally wide panels. The trapezoidal channels are parallel and attached to the rectangular fixture in a perpendicular manner.

TV mounts can also be adjustable, such as described in U.S. Pat. No. 7,152,836 entitled adjustable tilt mount, issued on Dec. 26, 2006 to Pfister et al. The mounting system for an interface such as a flat screen LCD panel display includes a virtual pivot axis to allow the panel to be pivoted, which passes through a center of gravity of the panel. The parallel channels are arch-shaped, which has a virtual pivot axis as its center, and permits the mount to be slideable. The mounting system can be connected directly or indirectly to a support surface to allow for the elevation of a panel. In U.S. Pat. No. D563,962 issued on Mar. 11, 2008, Grey describes an ornamental design entitled tilt mounting bracket for electronic display. This mounting apparatus requires two sets of parallel tilt mounting bracket connected together. The first set of parallel tilt mounting bracket is bow-shaped such that it hooks onto the top and bottom of the rectangular surface in a perpendicular manner. The second set of parallel tilt mounting bracket is flat, and the second set of parallel tilt mounting bracket is connected to the first set of parallel tilt mounting bracket.

Other inventors have found that using a pair of mounting brackets provide improved support and to enable titling. Burns in U.S. Pat. No. 7,712,717 issued on May 11, 2010 describes a mounting apparatus with mounting brackets for attaching a flat panel display to a vertical surface. The mounting apparatus has a pair of mounting brackets on the left and the right-end of the apparatus. The transverse arm is configured to rotate between an unlocked and locked position to secure a support arm, which is affixed to a bracket, which is affixed to the panel. The arm is slidably connected to the curve slots of the apparatus to enable tilting of the flat panel display.

Other inventors have found that an ornamental design for a flat screen television mount is best designed as a wall mount. Deuschle in U.S. Pat. No. D517,085 issued on Mar. 14, 2006 describes a flat screen television wall mount bracket. The wall mount is configured to sturdily mount to a wall, including a rectangular surface that clings onto a pair of flat parallel brackets situated perpendicular to the rectangular surface.

Sculler et al. describes in U.S. Pat. No. D587,694 issued on Mar. 3, 2009, entitled flat panel display mount, an ornamental design for a flat panel display mount. This mounting system consists of a rectangular surface, which is perpendicularly connected to a pair of parallel brackets. The parallel brackets are relatively long in length, such that one-third of the bracket is exposed above and below the rectangular surface. The parallel brackets are booked onto the sides of the rectangular surface at the top and bottom.

In U.S. Pat. No. D553,483 issued on Oct. 23, 2007, Grey describes a mounting bracket for electronic display with one single channel perpendicularly connected to a rectangular surface. The single channel can be arbitrarily positioned on the rectangular surface as the user desires.

Other inventors have found that two rails are sufficient to mount an electronic display, such as described in U.S. Pat. No. D610,437 entitled fixed two-rail mount for electronic display, issued on Feb. 23, 2010 to Bremmon et al. The two rail-mounts are parallel and perpendicular to the bracket channels. The first rail-mount is inserted through the first hole in both the first and second bracket channels. The second rail-mount is inserted through the second hole of the first and second bracket channels. The ornamental design is rectangular in shape with protruding edges in all directions, which is configured to make a hollow rectangle in the center of the fixed two-rail mount for electronic display.

In U.S. Pat. No. D538,632 issued on Mar. 20, 2007, Ly Hau et al. describes a tiltable universal mount for a medium flat panel display. The middle section of the pair of parallel brackets consists of a peak, which allows the brackets to be connected to another pair of parallel fixture, which is connected to the rectangular frame by hooking onto the top and bottom rails of the rectangular frame. The angle at which the parallel brackets are connected to the additional pair of parallel fixture is the configuration that allows the medium flat panel display to be tiltable.

Other inventors have found that allowing the parallel brackets to be released and angled while connected to the rectangular frame can improve the capabilities to tilt the television panel, as described by Muday et al. in U.S. Pat. No. D570,355 issued on Jun. 3, 2008 for an extra large low-profile tiltable mount for flat panel displays. The mounting system consists of a rectangular frame made up of two separate sets of identical and parallel rails. An isometric view of the extra large low-profile tiltable mount for flat panel displays in a vertical configuration shows a pair of parallel brackets connected to the right and left side of the rectangular frame at the top and bottom rails. In another isometric view of an extra large low-profile tiltable mount for flat panel displays in a tilted configuration shows the parallel brackets relapsed from the rectangular frame at a 45 degree angle, which improves the capabilities of the mounting system to allow the television panel to tilt.

In U.S. Pat. No. D594,001 issued on Jun. 9, 2009, Sexton describes a flat panel mounting system. The mounting system consists of a pair of parallel rails that is held parallel by an X-shaped connector. The brackets are flat and rounded at both ends, which is connected to the flat side of an additional pair of channels that is connected to the parallel rails at the top and bottom. The flat panel display is displayed on the flat surface created by the pair of parallel rails.

In U.S. Pat. No. D560,670 issued on Jan. 29, 2008, Anderson et al. describes a small universal fixed mount for a flat panel display. The mounting system consists of a rectangular frame that is hallow in the center. A pair of parallel brackets is connected to the back of the rectangular frame in a perpendicular positions, where the bottom of the parallel brackets are hooked onto the bottom frame and the top of the parallel brackets are discretely connected to the top of the frame so that the connection is not visible from the front of the rectangular frame. The mounting system lays flat and non-tiltable.

In U.S. Pat. No. D530,595 issued on Oct. 24, 2006, Lam et al. describes an ornamental design for a mounting system for a display unit. A pair of parallel brackets that is flat on one side and arched on the other side is connected to the back of a hallow rectangular frame. The pair of parallel brackets is substantially longer than the rectangular frame, where one-third of the bracket is protruding from the top of the rectangular frame and one-third of the bracket is protruding from the bottom of the rectangular frame. On the front of the hallow rectangular frame, a set of brackets is hung, which can be arbitrarily positioned to allow for the reinforcement of the flat panel display.

Dozier et al. describes a mounting device for a flat screen display panel in U.S. Pat. No. 7,624,959 issued on Dec. 1, 2009. The mounting device is a method for attaching a flat screen display panel, a wall bracket is attached to a support surface, a panel bracket is secured to a display panel, and the two brackets reinforce the display panel to allow pivotal adjustment. It consists of a top and bottom rail that is held in position by a pair of parallel brackets that runs perpendicular to the rails from behind.

In U.S. Pat. No. D624,061 issued on Sep. 21, 2010, Smith et al. describes an ornamental design for an electronic display mount with folding wall plate. The mounting system is created by a hallow rectangular frame with the attachment of a pair of parallel brackets on the back. The pair of parallel brackets is referred to as folding wall plates. The folding wall plates are mounted to the wall to allow for proper elevation of the electronic display.

Other inventors have found that non-enclosed rectangular frames are more suitable in the display of a panel in a mounting system. As described in U.S. Pat. No. 3,567,170 issued on Mar. 2, 1971, Albee et al., a mounting system can be a bracket consisting of legs to engage a wall or other surface, such that a rigid base is provided for mounting a panel display.

Other mounting systems are much more complex and include rotating handles and arms to allow for not only for the height of the display panel to be adjusted, but to also permit the rotation of the display panel as well. As described in U.S. Pat. No. 4,516,751 issued on May 14, 1985, Westbrook describes a mounting system as a wall bracket system in which it is vertically adjustable for supporting equipment and display panels. This sophisticated mounting system includes a mechanism for orienting the device at a desired angle and inclination in a vertical configuration. Another complex mounting system such as the one described in U.S. Pat. No. 6,276,655 by Byoun issued on Aug. 21, 2001 describes a flat panel display device as having a front case, a rear case, and a flat panel displaying an image that is supported by a circular recess and rotated in a range of certain predetermined angles.

SUMMARY OF THE INVENTION

A flat panel wall mount for mounting a flat panel to a wall has a wall bracket connecting with a mounting bracket. The wall bracket has a wall bracket left section and a wall bracket right section. The wall bracket left section connects to the wall bracket right section by connectors such as bolts and nuts. A wall bracket left section bottom joining tab is formed on the wall bracket and a wall bracket right section bottom joining tab is formed on the wall bracket. The wall bracket left section bottom joining tab connects to the wall bracket right section bottom joining tab. The wall bracket left section bottom joining tab is parallel to the wall bracket right section bottom joining tab.

A wall bracket left section top joining tab is formed on the wall bracket and a wall bracket right section top joining tab is formed on the wall bracket. The wall bracket left section top joining tab connects to the wall bracket right section top joining tab, and the wall bracket left section top joining tab is parallel to the wall bracket right section top joining tab. A wall bracket bottom flange is formed on the wall bracket and extends downwardly from an outside edge of a wall bracket bottom horizontal wall formed on the wall bracket. The wall bracket bottom horizontal wall extends outwardly from an inside rail of the wall bracket.

A wall bracket top flange is formed on the wall bracket and extends upwardly from an outside edge of a wall bracket top horizontal wall. The wall bracket top horizontal wall extends outwardly from the inside rail. A mounting bracket assembly includes a left mounting bracket arm and a right mounting bracket arm. A left mounting bracket lower section and a left mounting bracket upper section connect together to form the left mounting bracket arm; and a right mounting bracket lower section and the right mounting bracket upper section connect together to form the right mounting bracket arm. A mounting bracket lower section sidewall is formed on a side of the left mounting bracket lower section and is formed on a side of the right mounting bracket lower section.

A left mounting bracket first flange and a left mounting bracket second flange are formed on the left mounting bracket lower section. The left mounting bracket first flange and left mounting bracket second flange extend into a hollow portion of the left mounting bracket upper section along an inside surface of the left mounting bracket upper section. A right mounting bracket first flange and a right mounting bracket second flange are formed on the right mounting bracket lower section. The right mounting bracket first flange and right mounting bracket second flange extend into a hollow portion of the right mounting bracket upper section along an inside surface of the right mounting bracket upper section.

The left mounting bracket arm and the right mounting bracket arm both have a first hook and a second hook, namely a left mounting bracket arm first hook, a left mounting bracket arm second hook a right mounting bracket arm first hook and a right mounting bracket arm second hook. The left mounting bracket arm first hook is mounted to the mounting bracket lower section sidewall of the left mounting bracket lower section. The left mounting bracket arm second hook is mounted to the mounting bracket lower section sidewall of the left mounting bracket lower section. The right mounting bracket arm first hook is mounted to the mounting bracket lower section sidewall of the right mounting bracket lower section. The right mounting bracket arm second hook is mounted to the mounting bracket lower section sidewall of the right mounting bracket lower section. The upper flange receives four hook tips, formed on the right mounting bracket arm first hook, right mounting bracket arm second hook, left mounting bracket arm first hook, and left mounting bracket arm second hook.

The right mounting bracket lower section protrusion is formed on the right mounting bracket lower section, and the left mounting bracket lower section protrusion is formed on the left mounting bracket lower section. A pair of mounting bracket lower bolts thread through a pair of mounting bracket lower section openings formed on the right mounting bracket lower section protrusion and formed on the left mounting bracket lower section protrusion. The pair of mounting bracket lower bolts engages the wall bracket bottom horizontal wall.

A right adjustment bolt passes through a slot formed on the right mounting bracket upper section. A left adjustment bolt passes through a slot formed on the left mounting bracket upper section. The right adjustment bolt and the left adjustment bolt can be adjusted for controlling a tilt of the mounting bracket assembly.

A mounting bracket first bolt connects to a mounting bracket first nut. The mounting bracket first bolt passes through a mounting bracket hook opening, then a mounting bracket upper section first opening, then the mounting bracket second flange second opening, then the mounting bracket first flange second opening, then the mounting bracket upper section first opening on the other side and then the mounting bracket hook opening on the other side. A mounting bracket second bolt passes through a mounting bracket upper section second opening, then the mounting bracket first flange second opening, then the mounting bracket second flange second opening, then the mounting bracket upper section second opening again on the other side. The mounting bracket second bolt is secured by a mounting bracket second nut.

Figure 1:
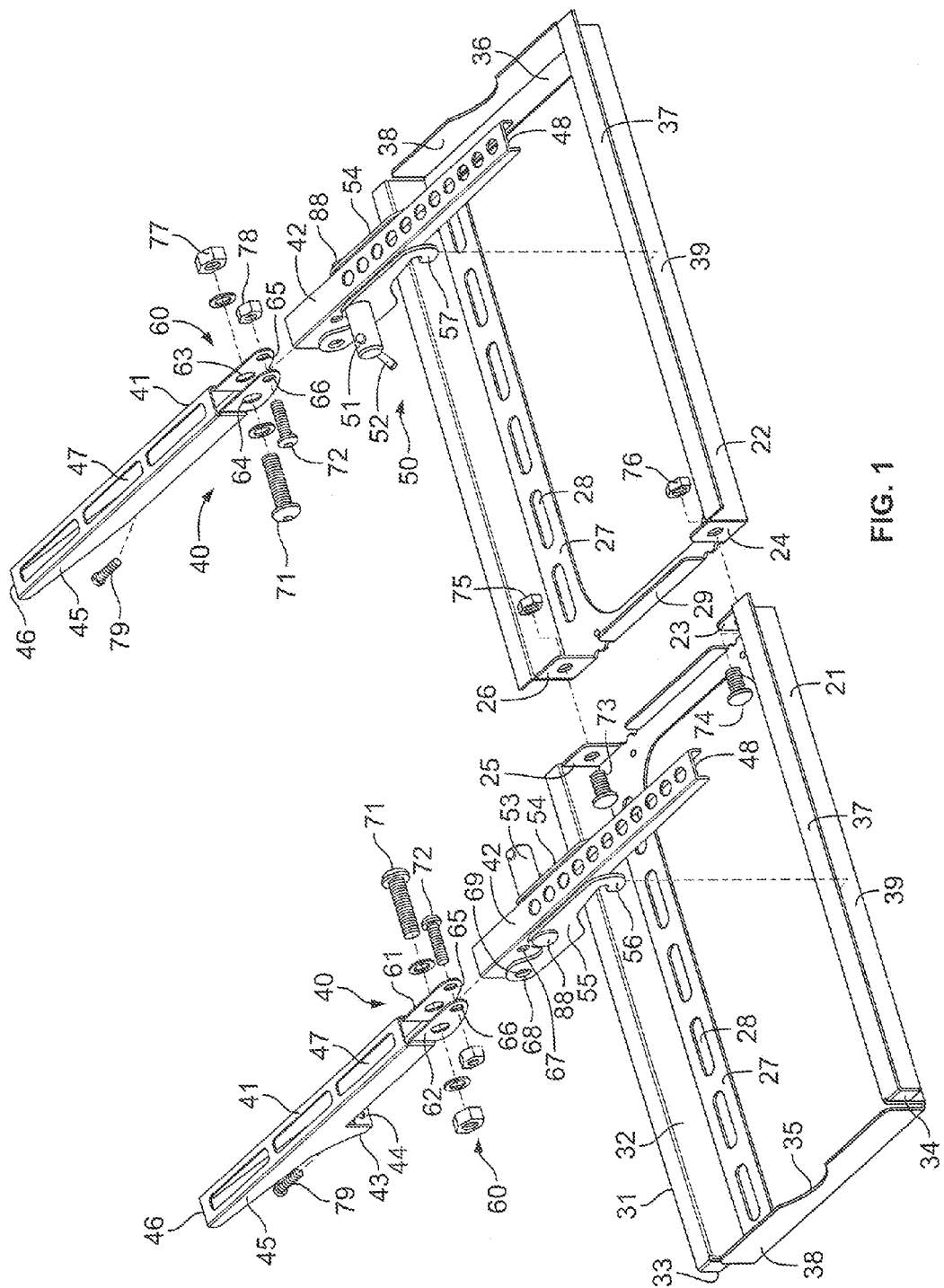
FIG. 1 is an exploded view of the present invention showing connection of the different parts of the TV wall mount with the top facing the viewer.
Figure 2:
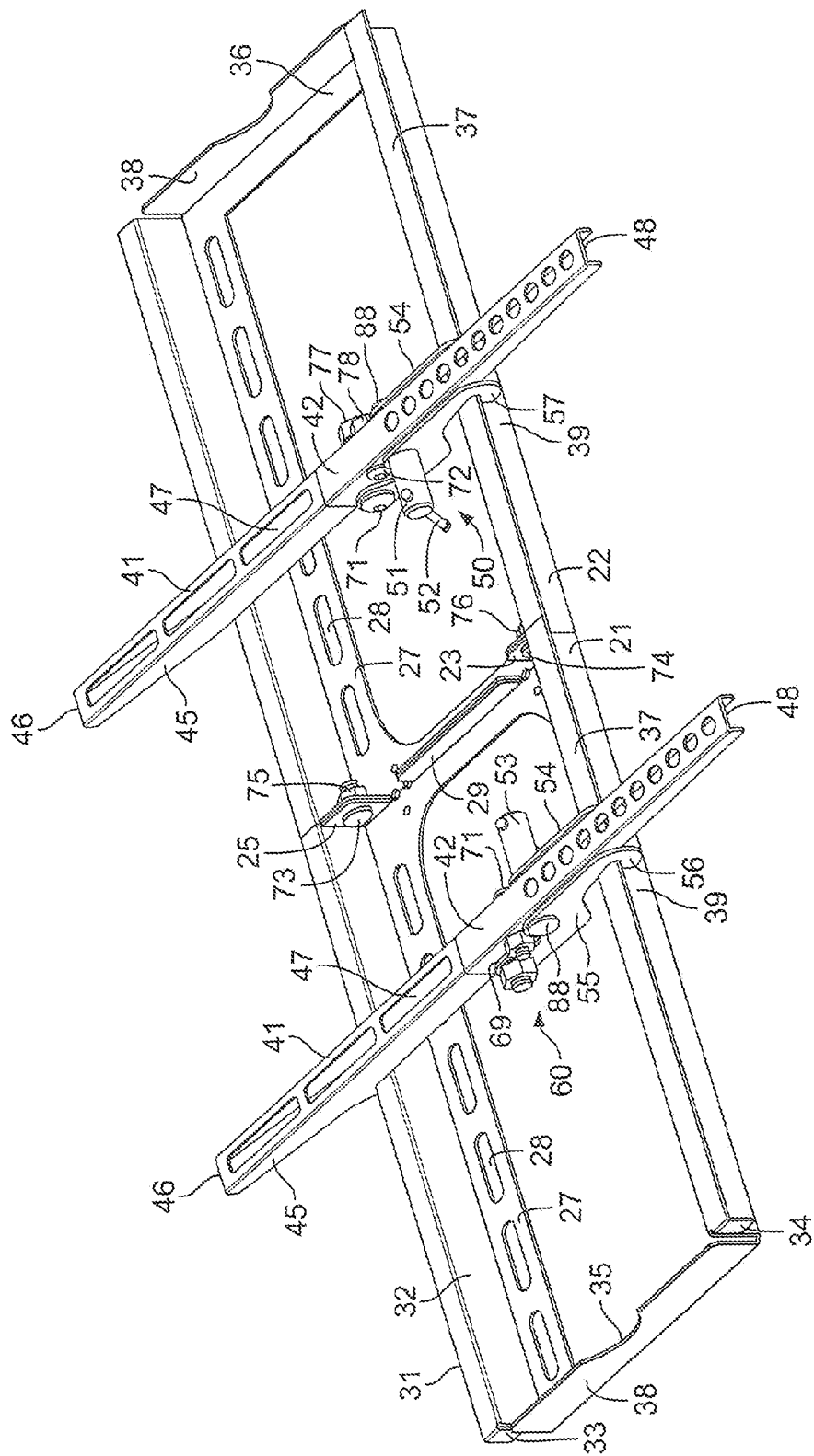
FIG. 2 is an assembled view showing final assembly shown as a user would assemble the mount with the wall bracket facing downward as if the mount were assembled on a table.

The following call out list of elements is a useful guide in referencing the elements of the drawings.

21 wall bracket left section
22 wall bracket right section
23 wall bracket left section top joining tab
24 wall bracket right section top joining tab
25 wall bracket left section bottom joining tab
26 wall bracket right section bottom joining tab
27 wall bracket inside rail
28 wall bracket inside rail wall mounting hole
29 wall bracket abutment tab
31 wall bracket bottom flange
32 wall bracket bottom horizontal wall
33 wall bracket outside bottom corner tab
34 wall bracket outside top corner tab
35 wall bracket sidewall rim indent
36 wall bracket vertical side inside rail
37 wall bracket top flange
38 wall bracket sidewall
39 wall bracket top horizontal wall
40 mounting bracket assembly
41 mounting bracket lower section
42 mounting bracket upper section
43 mounting bracket lower section protrusion
44 mounting bracket lower section opening
45 mounting bracket lower section sidewall
46 mounting bracket lower section tip
47 mounting bracket vertical slot
48 mounting bracket upper section tip
50 mounting bracket tilt adjustment assembly
51 right adjustment bolt
52 adjustment bolt arm
53 left adjustment bolt
54 first hook
55 second hook
56 left hook tip
57 right hook tip
60 mounting bracket connector
61 mounting bracket first flange
62 mounting bracket second flange
63 mounting bracket first flange first opening
64 mounting bracket second flange first opening
65 mounting bracket first flange second opening
66 mounting bracket second flange second opening
67 mounting bracket upper section second opening
68 mounting bracket upper section first opening
69 mounting bracket hook opening
71 mounting bracket first bolt
72 mounting bracket second bolt
73 wall bracket bottom bolt
74 wall bracket top bolt
75 wall bracket bottom nut
76 wall bracket top nut
77 mounting bracket first nut
78 mounting bracket second nut
79 mounting bracket lower bolt
88 adjustment bolt anchor
139 joining tab bolt hole
188 arcuate slot

DETAILED DESCRIPTION OF THE PREFERRED EMBODIMENT

According to the preferred embodiment of the present invention, as seen in FIG. 1, a wall bracket secures to a mounting bracket. A wall bracket left section 21 secures to a wall bracket right section 22 to form a rectangular shaped wall bracket which is a rigid frame. The wall bracket left section 21 has a wall bracket left section top joining tab 23 which connects to a wall bracket right section top joining tab 24 such as by known connectors such as nuts and bolts. The wall bracket left section bottom joining tab 25 has an opening so that it can be nut and bolt or screw connected to wall bracket right section bottom joining tab 26.

The wall bracket has an inside rail 27 which has a wall bracket inside rail wall mounting hole 28. The wall bracket inside rail 27 can be disposed in a pair of horizontal strips at a lower and upper portion of the wall bracket left or right section. As shown in FIG. 1, the wall bracket left section and wall bracket right section are preferably symmetrical to each other in mirror image. As shown in FIG. 1, the wall bracket left section is preferably symmetrical to itself along a horizontal line bisecting the wall bracket left section 21. Similarly, the wall bracket right section is preferably symmetrical to itself along a horizontal line bisecting the wall bracket right section 22. The dimensions of the wall bracket inside rail wall mounting hole 28 are preferably similar at an upper end and at a lower end. The inside rail wall mounting hole 28 can be formed as a horizontal pill shaped slot.

Figure 3:
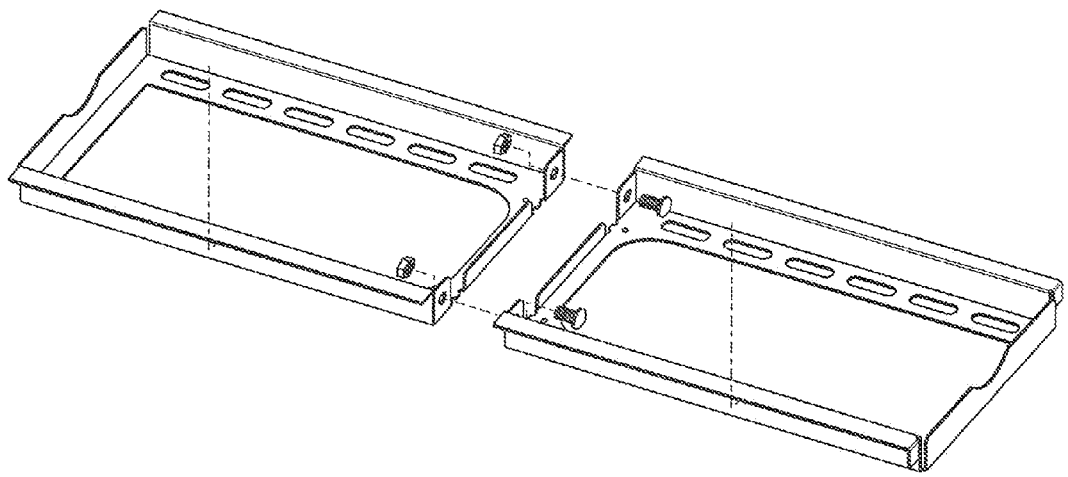
FIG. 3 is a view of the top side of the wall bracket showing that the top side is symmetrical to the bottom side.
Figure 4:
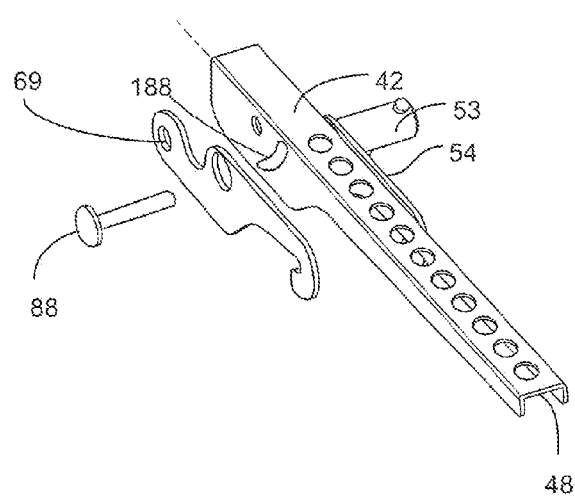
FIG. 4 is a close up view of a part of the present invention.

The wall bracket has been reversed in FIG. 3 to show that the top side is the same as the bottom side such not only a single design for a wall bracket section needs to be produced. The pair of wall bracket sections meet at a wall bracket abutment tab 29 which extends outwardly from the inside rail 27. The wall bracket abutment tab 29 is preferably planar and normal to the inside rail 27 such that the wall bracket abutment tab forms a sidewall of the wall bracket.

A wall bracket bottom flange 31 extends downwardly from an outside edge of the wall bracket bottom horizontal wall 32.

The wall bracket bottom horizontal wall 32 extends outwardly from the inside rail 27. The wall bracket bottom flange 31 is preferably similar to the wall bracket top flange 37. The wall bracket top flange 37 extends outwardly from an outside edge of the wall bracket top horizontal wall 39. The wall bracket top horizontal wall 39 extends outwardly from the inside rail 27. The wall bracket top flange 37 preferably includes a wall bracket outside top corner tab 34 which bends to a 90° angle from the wall bracket top flange 37. Similarly, the wall bracket outside bottom corner tab 33 extends from the wall bracket bottom flange 31 and the wall bracket outside bottom corner tab 33 is bent to a 90° angle from the wall bracket bottom flange 31.

The flange has a thickness that may be thicker than a single sheet of metal.

The wall bracket sidewall 38 extends outwardly from the inside rail 27 of the wall bracket. The wall bracket sidewall 38 is preferably bent to a 90° outwardly from the inside rail 27. The wall bracket sidewall preferably includes a wall bracket sidewall rim indent 35. The wall bracket sidewall rim indent 35 is preferably formed as an arc shaped cutout of the wall bracket sidewall 38 and is positioned at a horizontal midline of a right or left wail bracket section.

The inside rail 27 of the wall bracket extends to one or more wall bracket vertical side inside rail 36. The inside rail 27 may include one or more wall bracket vertical inside rails 36 so as to form a planar rectangular frame.

A mounting bracket assembly 40 connects to the wall bracket. The flat panel display can be mounted to the mounting bracket assembly 40. The mounting bracket has a mounting bracket lower section 41 and a mounting bracket upper section 42.

Additionally, the mounting bracket lower section has a mounting bracket lower section protrusion 43 for abutting against the wall bracket bottom flange 31. The mounting bracket lower section can be formed with a large mounting bracket lower section protrusion 43 as shown on the left side of FIG. 1, or can be formed with a small mounting bracket lower section protrusion as shown on the right side of FIG. 1. A greater protrusion may allow easier assembly, but a smaller protrusion provides a more compact design.

The mounting bracket lower section protrusion 43 preferably has a service for receiving a mounting bracket lower section opening 44 that is preferably threaded to allow a screw or bolt to be threaded to the mounting bracket lower section opening 44. The mounting bracket has a mounting bracket lower section preferably made by folding a sheet of metal and then welding certain portions together. The mounting bracket lower section can have a mounting bracket lower section sidewall 45. The mounting bracket lower section and the mounting bracket lower section sidewall 45 extends downward to a mounting bracket lower section tip 46. The mounting bracket has one or more mounting bracket vertical slots 47 that allow a user to connect a bolt to a flat-panel display.

The mounting bracket also has an upper section that terminates at a mounting bracket upper section tip 48. The mounting bracket upper section is connected to the mounting bracket lower section using connectors such as nuts and bolts. The mounting bracket has a mounting bracket tilt adjustment assembly 50. The mounting bracket upper section 42 has a right adjustment bolt 51 and a left adjustment bolt 53. The adjustment bolts may have an adjustment bolt arm 52 to allow manual adjustment and tightening of the adjustment bolts.

The mounting bracket tilt adjustment assembly 50 preferably has a pair of hooks at each of the left and right mounting bracket arms. A first hook 54 is swivel mounted on the adjustment bolt on a right side of a mounting bracket arm and a second hook 55 is also swivel mounted on the adjustment bolt, but on the left side of the mounting bracket arm. With each of the arms having a pair of hooks, namely the first hook and a second hooks, a total of four hooks can be attached to the mounting bracket assembly. The left hook has a left hook tip 56 down of the right hook has a right hook tip 57. The left hook tip 56 passes over the wall bracket top flange 37 so as to hook the mounting bracket onto the top flange 37. Similarly, the right hook tip 57 passes over the wall bracket top flange 37 so as to hook the mounting bracket onto the top flange 37.

Each arm of the mounting bracket has an upper and lower section connected together at a mounting bracket connector 60. The mounting bracket connector 60 includes a mounting bracket first flange 61 and a mounting bracket second flange 62. The mounting bracket first flange 61 and a mounting bracket second flange 62 are preferably parallel to each other. The mounting bracket first flange 61 and the mounting bracket second flange 62 can extend from the mounting bracket lower section sidewall 45, but bent inward so as to engage in inside surface of the mounting bracket upper section 42. The mounting bracket first flange 61 and mounting bracket second flange 62 preferably have a flat outer profile which matches an outer flat surface of the mounting bracket in general.

The mounting bracket first flange has a mounting bracket first flange first opening 63 and a mounting bracket first flange second opening 65. The mounting bracket second flange has a mounting bracket second flange first opening 64 and a mounting bracket second flange second opening 66. The mounting bracket second flange second opening 66 and the mounting bracket first flange second opening 65 are aligned with a mounting bracket upper section second opening 67 that is formed on the mounting bracket upper section 42. The mounting bracket second flange first opening 64 and the mounting bracket first flange first opening 63 are aligned with the mounting bracket upper section first opening 68. The mounting bracket second flange first opening 64 and the mounting bracket first flange first opening 63 are also aligned with the mounting bracket hook opening 69.

The alignment of the openings in the mounting bracket provides screw or bolt connection. The mounting bracket first bolt 71 can be connected to a mounting bracket first nut 77. The mounting bracket first bolt 71 preferably passes through the mounting bracket hook opening 69, then the mounting bracket upper section first opening 68, then the mounting bracket second flange second opening 66, then the mounting bracket first flange second opening 65, then the mounting bracket upper section first opening on the other side and then the mounting bracket hook opening on the other side. This connects the upper section to the lower section. The mounting bracket second bolt 72 passes through the mounting bracket upper section second opening 67, then the mounting bracket first flange second opening 65, then the mounting bracket second flange second opening 66, then the mounting bracket upper section second opening again on the other side. The mounting bracket second bolt 72 is secured by a mounting bracket second nut 78.

The wall bracket bottom bolt 73 passes through the wall bracket left section bottom joining tab 25 and then the wall bracket right section bottom joining tab 26. The wall bracket left section bottom joining tab and the wall bracket right section bottom joining tab have a joining bolt hole 139 that can optionally be threaded to the bolt passing through it. The wall bracket top bolt 74 connects to a wall bracket top nut 76. Similarly, the wall bracket bottom bolt 73 connects to the wall bracket bottom nut 75.

Finally, the mounting bracket lower bolt 79 passes through the mounting bracket lower section opening 44 and since the mounting bracket lower section opening 44 is threaded, the mounting bracket lower bolt 79 removably secures the mounting bracket arm and particularly the mounting bracket lower section protrusion 23 to the wall bracket bottom horizontal wall. The tip of the mounting bracket lower bolt pushes against a bottom surface of the wall bracket bottom horizontal wall 32 so as to secure the mounting bracket arm between the wall bracket bottom flange 31 and the wall bracket top flange 37. As the mounting bracket lower bolt 79 of the mounting bracket arms are tightened, the left hook tip 56 and the right hook tip 57 are drawn against the top edge of the wall bracket top flange 37 so as to clamp the mounting bracket arms to the pair of extending flanges. Once the mounting bracket lower bolt 79 of both mounting bracket arms are tightened, the mounting bracket arms are locked on to the wall bracket.

The mounting bracket lower bolt 79 can remain not fully tightened until the display is mounted to the pair of mounting bracket arms.

The final step of user assembly is to adjust the tilt. The device has tilt adjustment so that the display can be oriented in an upward or downward angle. The tilt adjustment relies on the adjustment of the right adjustment bolt 51 and the last adjustment bolt 53. The pair of adjustment bolts both have a bolt anchor shaft 88 that extends through the entire width of the mounting bracket upper section 42. The adjustment bolt anchor shaft 88 further includes a flat protrusion that sandwiches the second hook 55 to the first hook 54 with the mounting bracket upper section 42 in the middle. When loose, the bolt anchor shaft 88 allows the second hook 55 to move relative to the mounting bracket upper section 42. The mounting bracket upper section 42 has an arcuate slot 188 that the bolt anchor shaft 88 slides in. When the user has achieves the desired tilt and wants to finalize the adjustment, the user tightens the pair of adjustment bolts so that the bolt anchor shaft 88 does not move in the arcuate slot, but is rather locked in place by the clamp force. The arcuate slot 188 has a tilt up position opposite a tilt down position. The bolt anchor shaft 88 can move from the tilt up position to the tilt down position.

The terminology of outside and inside is made relative to the wall where the direction toward the wall is the inside direction and worth a direction away from the wall is the outside direction. The following claims define the scope of the invention.

The invention claimed is:

1. A flat panel wall mount for mounting a flat panel to a wall comprising:
    a. a wall bracket comprising a wall bracket left section; and a wall bracket right section, wherein the wall bracket left section connects to the wall bracket right section;
    b. a wall bracket left section bottom joining tab formed on the wall bracket and a wall bracket right section bottom joining tab formed on the wall bracket, wherein the wall bracket left section bottom joining tab connects to the wall bracket right section bottom joining tab, wherein the wall bracket left section bottom joining tab is parallel to the wall bracket right section bottom joining tab;
    c. a wall bracket left section top joining tab formed on the wall bracket and a wall bracket right section top joining tab formed on the wall bracket, wherein the wall bracket left section top joining tab connects to the wall bracket right section top joining tab, wherein the wall bracket left section top joining tab is parallel to the wall bracket right section top joining tab;
    d. a wall bracket bottom flange formed on the wall bracket and extending downwardly from an outside edge of a wall bracket bottom horizontal wall formed on the wall bracket, wherein the wall bracket bottom horizontal wall extends outwardly from an inside rail of the wall bracket;
    e. a wall bracket top flange formed on the wall bracket and extending upwardly from an outside edge of a wall bracket top horizontal wall, wherein the wall bracket top horizontal wall extends outwardly from the inside rail;
    f. a mounting bracket assembly comprising a left mounting bracket arm and a right mounting bracket arm;
    g. a left mounting bracket lower section and a left mounting bracket upper section, wherein the left mounting bracket lower section and the left mounting bracket upper section connect together to form the left mounting bracket arm; and a right mounting bracket lower section and a right mounting bracket upper section, wherein the right mounting bracket lower section and the right mounting bracket upper section connect together to form the right mounting bracket arm; and
    h. a mounting bracket lower section sidewall formed on a side of the left mounting bracket lower section and formed on a side of the right mounting bracket lower section.

2. The flat panel wall mount of claim 1, further including a left mounting bracket first flange and a left mounting bracket second flange formed on the left mounting bracket lower section, wherein the left mounting bracket first flange and left mounting bracket second flange extend into a hollow portion of the left mounting bracket upper section along an inside surface of the left mounting bracket upper section; and further including a right mounting bracket first flange and a right mounting bracket second flange formed on the right mounting bracket lower section, wherein the right mounting bracket first flange and right mounting bracket second flange extend into a hollow portion of the right mounting bracket upper section along an inside surface of the right mounting bracket upper section.

3. The flat panel wall mount of claim 2, wherein the left mounting bracket arm and the right mounting bracket arm both have a first hook and a second hook, namely a left mounting bracket arm first hook, a left mounting bracket arm second hook a right mounting bracket arm first hook and a right mounting bracket arm second hook; wherein the left mounting bracket arm first hook is mounted to the mounting bracket lower section sidewall of the left mounting bracket lower section, wherein the left mounting bracket arm second hook is mounted to the mounting bracket lower section sidewall of the left mounting bracket lower section; wherein the right mounting bracket arm first hook is mounted to the mounting bracket lower section sidewall of the right mounting bracket lower section, wherein the right mounting bracket arm second hook is mounted to the mounting bracket lower section sidewall of the right mounting bracket lower section.

4. The flat panel wall mount of claim 3, wherein the upper flange receives four hook tips, formed on the right mounting bracket arm first hook, right mounting bracket arm second hook, left mounting bracket arm first hook, and left mounting bracket arm second hook.

5. The flat panel wall mount of claim 2, further comprising a right mounting bracket lower section protrusion and a left mounting bracket lower section protrusion, wherein the right mounting bracket lower section protrusion is formed on the right mounting bracket lower section, and wherein the left mounting bracket lower section protrusion is formed on the left mounting bracket lower section, further comprising a pair of mounting bracket lower bolts threading through a pair of mounting bracket lower section openings formed on the right mounting bracket lower section protrusion and formed on the left mounting bracket lower section protrusion, wherein the pair of mounting bracket lower bolts engages the wall bracket bottom horizontal wall.

6. The flat panel wall mount of claim 2, further comprising a right adjustment bolt passing through a slot formed on the right mounting bracket upper section, further comprising a left adjustment bolt passing through a slot formed on the left mounting bracket upper section, wherein the right adjustment bolt and the left adjustment bolt can be adjusted for controlling a tilt of the mounting bracket assembly.

7. The flat panel wall mount of claim 2, wherein the left mounting bracket first flange has a left mounting bracket first flange first opening and a left mounting bracket first flange second opening, wherein the left mounting bracket second flange has a left mounting bracket second flange first opening and a left mounting bracket second flange second opening; wherein the right mounting bracket first flange has a right mounting bracket first flange first opening and a right mounting bracket first flange second opening, wherein the right mounting bracket second flange has a right mounting bracket second flange first opening and a right mounting bracket second flange second opening.

8. The flat panel wall mount of claim 7, wherein the left mounting bracket arm and the right mounting bracket arm both have a first hook and a second hook, namely a left mounting bracket arm first hook, a left mounting bracket arm second hook a right mounting bracket arm first hook and a right mounting bracket arm second hook; wherein the left mounting bracket arm first hook is mounted to the mounting bracket lower section sidewall of the left mounting bracket lower section, wherein the left mounting bracket arm second hook is mounted to the mounting bracket lower section sidewall of the left mounting bracket lower section; wherein the right mounting bracket arm first hook is mounted to the mounting bracket lower section sidewall of the right mounting bracket lower section, wherein the right mounting bracket arm second hook is mounted to the mounting bracket lower section sidewall of the right mounting bracket lower section.

9. The flat panel wall mount of claim 8, wherein the upper flange receives four hook tips, formed on the right mounting bracket arm first hook, right mounting bracket arm second hook, left mounting bracket arm first hook, and left mounting bracket arm second hook.

10. The flat panel wall mount of claim 7, further comprising a right mounting bracket lower section protrusion and a left mounting bracket lower section protrusion, wherein the right mounting bracket lower section protrusion is formed on the right mounting bracket lower section, and wherein the left mounting bracket lower section protrusion is formed on the left mounting bracket lower section, further comprising a pair of mounting bracket lower bolts threading through a pair of mounting bracket lower section openings formed on the right mounting bracket lower section protrusion and formed on the left mounting bracket lower section protrusion, wherein the pair of mounting bracket lower bolts engages the wall bracket bottom horizontal wall.

11. The flat panel wall mount of claim 7, further comprising a right adjustment bolt passing through a slot formed on the right mounting bracket upper section, further comprising a left adjustment bolt passing through a slot formed on the left mounting bracket upper section, wherein the right adjustment bolt and the left adjustment bolt can be adjusted for controlling a tilt of the mounting bracket assembly.

12. The flat panel wall mount of claim 7, further comprising a mounting bracket first bolt for connection to a mounting bracket first nut, wherein the mounting bracket first bolt passes through a mounting bracket hook opening, then a mounting bracket upper section first opening, then the mounting bracket second flange second opening, then the mounting bracket first flange second opening, then the mounting bracket upper section first opening on the other side and then the mounting bracket hook opening on the other side; wherein a mounting bracket second bolt passes through a mounting bracket upper section second opening, then the mounting bracket first flange second opening, then the mounting bracket second flange second opening, then the mounting bracket upper section second opening again on the other side, wherein the mounting bracket second bolt is secured by a mounting bracket second nut.

13. The flat panel wall mount of claim 1, wherein the left mounting bracket arm and the right mounting bracket arm both have a first hook and a second hook, namely a left mounting bracket arm first hook, a left mounting bracket arm second hook a right mounting bracket arm first hook and a right mounting bracket arm second hook; wherein the left mounting bracket arm first hook is mounted to the mounting bracket lower section sidewall of the left mounting bracket lower section, wherein the left mounting bracket arm second hook is mounted to the mounting bracket lower section sidewall of the left mounting bracket lower section; wherein the right mounting bracket arm first hook is mounted to the mounting bracket lower section sidewall of the right mounting bracket lower section, wherein the right mounting bracket arm second hook is mounted to the mounting bracket lower section sidewall of the right mounting bracket lower section.

14. The flat panel wall mount of claim 4, wherein the upper flange receives four hook tips, formed on the right mounting bracket arm first hook, right mounting bracket arm second hook, left mounting bracket arm first hook, and left mounting bracket arm second hook.

15. The flat panel wall mount of claim 1, further comprising a right mounting bracket lower section protrusion and a left mounting bracket lower section protrusion, wherein the right mounting bracket lower section protrusion is formed on the right mounting bracket lower section, and wherein the left mounting bracket lower section protrusion is formed on the left mounting bracket lower section, further comprising a pair of mounting bracket lower bolts threading through a pair of mounting bracket lower section openings formed on the right mounting bracket lower section protrusion and formed on the left mounting bracket lower section protrusion, wherein the pair of mounting bracket lower bolts engages the wall bracket bottom horizontal wall.

16. The flat panel wall mount of claim 1, further comprising a right adjustment bolt passing through a slot formed on the right mounting bracket upper section, further comprising a left adjustment bolt passing through a slot formed on the left mounting bracket upper section, wherein the right adjustment bolt and the left adjustment bolt can be adjusted for controlling a tilt of the mounting bracket assembly.

* * * * *